United States Patent [19]

Sullivan

[11] 4,232,099
[45] Nov. 4, 1980

[54] NOVEL BATTERY ASSEMBLY

[75] Inventor: Charles I. Sullivan, Melrose, Mass.

[73] Assignee: Polaroid Corporation, Cambridge, Mass.

[21] Appl. No.: 656,063

[22] Filed: Feb. 6, 1976

Related U.S. Application Data

[63] Continuation of Ser. No. 442,376, Feb. 14, 1974, abandoned.

[51] Int. Cl.² .............................................. H01M 6/46
[52] U.S. Cl. .................................. 429/152; 429/162; 429/185
[58] Field of Search ........................... 136/111, 134; 429/152–155, 162, 156–160, 185

[56] References Cited

U.S. PATENT DOCUMENTS

| | | | |
|---|---|---|---|
| 3,563,805 | 2/1971 | Deierhoi, Jr. ...................... 136/111 |
| 3,617,387 | 11/1971 | Grulke et al. ...................... 136/111 |
| 3,734,780 | 5/1973 | Bilhorn et al. ...................... 136/111 |
| 3,770,504 | 11/1973 | Bergum ........................... 136/111 X |
| 3,784,414 | 1/1974 | Macaulay et al. ............... 136/111 X |
| 3,877,045 | 4/1975 | Bloom ............................. 136/111 X |
| 3,912,543 | 10/1975 | Delahunt ........................... 136/111 |

*Primary Examiner*—Charles F. LeFevour
*Attorney, Agent, or Firm*—John W. Ericson; Stanley H. Mervis

[57] ABSTRACT

A relatively thin, flat or planar battery is disclosed which includes one or more cells in series relationship each comprising a planar anode in superposed relationship with a planar cathode and a separator disposed intermediate and extending substantially coextensive the facing surfaces of the anode and cathode possessing marginal portions and an aqueous electrolyte permeable central portion. Each cell includes an aqueous electrolyte disposed in the central portion of the separator and in contact with the facing surfaces of both the anode and the cathode and an electrically nonconducting polyacrylate sealant extending intermediate and providing adhesive contact between the marginal portions of the separator and next adjacent facing surfaces.

2 Claims, 2 Drawing Figures

NOVEL BATTERY ASSEMBLY

This application is a continuation of U.S. application Ser. No. 442,376, filed Feb. 14, 1974 now abandoned.

BACKGROUND OF THE INVENTION

The present invention is concerned with new and improved flat or planar batteries of the general type disclosed in U.S. Pat. Nos. 3,563,805; 3,617,387; 3,734,780; and the like.

As disclosed in the cited patents, in general such planar energy cells or batteries comprise superposed planar anode/cathode combinations possessing a separator disposed intermediate each anode and cathode and electrolyte disposed on or impregnated in the separator and in contact with respective facing surfaces of the anode and cathode.

Planar batteries of the type disclosed in the aforementioned U.S. patents are generally intended to be employed as an individual power source for portable electrically operated devices wherein the selected device design parameters are optimized by the availability and employment of a planar battery exhibiting reliability with respect to its power delivery characteristics. Batteries of the type in question presently are employed commercially to operate the various electrically powered systems of the photographic camera sold by Polaroid Corporation, Cambridge, Massachusetts, U.S.A., under the trademark "SX-70". In such cameras, the battery, disposed as a component of a film pack for emmployment in and in combination with the camera, provides the electrical energy necessary to operate the camera's exposure control, film transport and photoflash systems and, accordingly, such battery is required to operate in a sequential series of power generating modes which may or may not be interrupted by more or less extended recovery and/or storage times and under which conditions to deliver the required series of high current pulses dictated by the photographic system design.

As disclosed in U.S. Pat. No. 3,543,662, and the like, such batteries may constitute a constituent component of a photographic film assembly which comprises a cassette configured to retain a predetermined number of film units for selective sequential photoexposure and a flat or planar battery for powering various photographic camera instrumentalities for photographic employment of the film units.

In present commercial employment, the planar batteries distributed comprise, in essence, primary batteries of the LeClanche type employing an aqueous electrolyte system which includes the conventional ionizable ammonium and/or zinc salt components of such type, e.g., ammonium and/or zinc chloride, and mercuric chloride present to inhibit the generation of hydrogen derived from electrolyte attach on LeClanche type zinc constituted battery anode materials.

In view of the critical necessity to maintain the various active layers and materials constituting a planar battery of the type set forth in the aforementioned U.S. patents, in intimate contiguous contact and to prevent electrolyte solvent loss during storage and employment, in order to reduce, to the extent possible, internal resistance within the cells constituting the battery, it is imperative that the adhesive seals effectively function to maintain the physical conformation and integrity of the battery preventing environmental attack on, or loss of, active components constituting the battery's electrochemical system.

SUMMARY OF THE INVENTION

The present invention is directed to a new and improved energy cell or battery which comprises one or more individual cells each of which include a planar anode superposed substantially coextensive a planar cathode and possessing a planar separator including an electrolyte permeable central portion surrounded by substantially electrolytefree marginal portions positioned between the anode and cathode. Aqueous electrolyte is disposed in the central portion of the separator and in contact with opposed facing surfaces of both the anode and cathode and the battery specifically includes an electrically nonconducting polyacrylate adhesive sealant extending coextensive and intermediate marginal portions of the separator and next adjacent facing surfaces.

DETAILED DESCRIPTION OF THE INVENTION

As disclosed in previously mentioned U.S. Pat. No. 3,543,662, a film pack or cassette for photographic cameras may be configured to retain a number of film units for selective sequential exposure and a flat or planar battery assembly for powering various photographic camera instrumentalities for employment of the film units.

In accordance with the present invention, the preferred form of a battery assemblage of the present invention for employment in such film assemblage comprises one or more planar electrical energy cells, each cell in series relationship and including superposed planar anode and cathode elements having disposed between their facing surfaces a separator possessing an electrolyte permeable central portion or section surrounded by substantially electrolyte-free marginal portions. Aqueous electrolyte is disposed in the central section and in contact with the facing surfaces of both the anode and cathode, and electrically nonconducting polyacrylate adhesive is disposed providing an aqueous electrolyte impermeable seal between the marginal portions of the separator and the next adjacent facing anode and cathode surfaces to prevent escape of the aqueous electrolyte from its spacial location within the electrical energy generating components of the cell. Each battery is preferably designed to specifically include a planar anode and/or cathode next adjacent a surface of the battery which includes a planar conductive metal sheet; a gas permeable, water-vapor impermeable planar plastic sheet; and an electrochemically active anode or cathode material, and at least one such conductive metal sheets most preferably includes one or more orifices extending through the metal sheet to conduct gas generated or liberated within the battery from its structure.

The gas permeable, water-vapor impermeable plastic sheet material is disposed intermediate, and in intimate contact with, the conductive metal sheet and next adjacent anode or cathode material, and itself comprises an electrically conductive sheet material underlying the orifices disposed in the metal sheet, most preferably extending coextensive the metal sheet and functioning as a battery collector element. It will also be recognized that the plastic sheet material may overlie the metal sheet orifices in which case it may optionally be constituted as electrically conductive or insulative at the option of the operator and that such construction will be most generally employed in battery structures wherein the metal sheet element itself comprises the active electrode material such as, for example, an active sheet zinc LeClanche anode possessing the gas ports denoted above.

Figure 1:
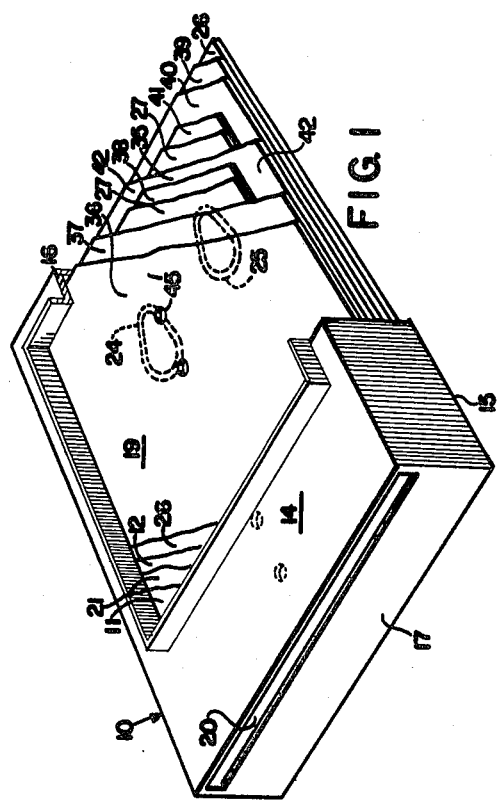
FIG. 1 is a fragmentary perspective view of one embodiment of a photographic film assemblage in accordance with the present invention and including a cassette, photographic film units, spring biasing member, gas collector, and planar battery.
Figure 2:
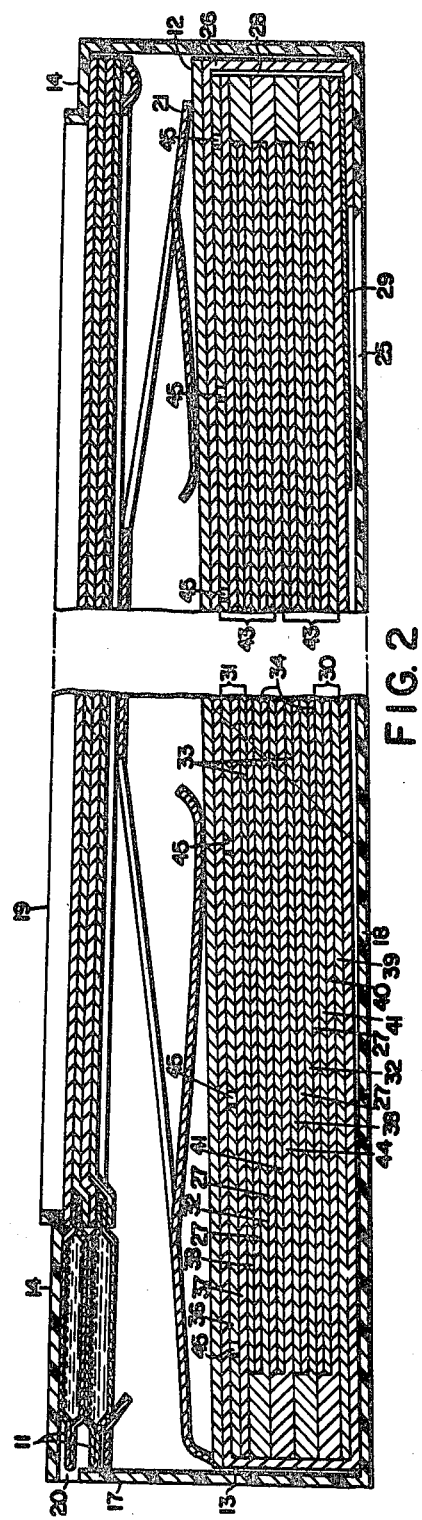
FIG. 2 is a diagrammatic enlarged cross-sectional view of a film assemblage of the type set forth in FIG. 1, along section line 2—2, illustrating the association of elements comprising the photographic film assemblage.

As seen by reference to perspective FIG. 1 and cross-sectional FIG. 2, the cassette may comprise a generally parallelepiped container or box 10 for holding and enclosing a plurality of film units 11, gas collector means 12 and a planar battery assemblage 13. Container 10 is shown as comprising a forward wall 14, side walls 15, a trailing end wall 16, a leading end wall 17, and a rear wall 18 and may be formed of a resilient plastic material. Forward wall 14 is provided with a generally rectangular exposure aperture 19 for transmitting light for exposing film units 11 carried within container 10. Leading end wall 17 is provided with a generally rectangular slot or exit orifice to provide a passage 20 at the leading end of the container through which film units 11 carried by the container are adapted to be individually withdrawn. Container 10 may additionally be provided with a dark slide or cover sheet (not shown) of any suitable opaque material such as paper or plastic sheet material positioned between the forwardmost film unit 11 and aperture 19 to serve as a light seal and which may be removed through withdrawal slot 20 once container 10 is located in its operative position within a camera apparatus.

The stack arrangement within container 10 of a plurality of film units 11 (one is shown in FIG. 1 and two are shown in FIG. 2), gas collector 12 and planar battery assemblage 13 is specifically illustrated in FIG. 2. Each film unit 11 is arranged in overlying relationship with its exposure surface facing in the direction of exposure aperture 19.

As disclosed in aforementioned U.S. Pat. No. 3,543,662, the cassette additionally includes a springloaded platform 21 positioned between battery assemblage 13 and next adjacent film unit 11 for compressively retaining the battery terminals next adjacent cassette terminal ports 24 and 25 for interengagement with camera electrical leads, and for biasing film units 11 in the direction of exposure aperture 19.

The completed film cassette assemblage including film units 11, spring member 21, collector 12 and battery 13 shown in FIGS. 1 and 2 is adapted for direct employment in camera devices of the type previously mentioned and disclosed in detail in U.S. Pat. Nos. 3,643,565; 3,714,879; and the like.

As shown in FIGS. 1 and 2, battery 13 may include gas permeable envelope or container 26 retaining the superposed electrical energy generating components of the battery disposed within, for example, an electrically nonconducting water-vapor impervious thermoplastic envelope extending around and coextensive the external or exterior surfaces of the generating components. Envelope 26 acts to encapsulate the energy components to further prevent escape of aqueous electrolyte 27 and/or electrolyte solvent or vapor from its predetermined spacial location within battery 13's structure.

Electrical leads 28 and 29, respectively, extend from the interior of the battery and, specifically, individually from cathode or positive electrode 30 and from anode or negative electrode 31 of battery 13 for electrical interconnection with the intended device to be powered by the cell.

As seen by reference to FIGS. 1 and 2, the electrical energy generating components of battery 13 comprise, in essence, planar anode 31 in superposed relationship with planar cathode 30 having separator 32 disposed intermediate facing surfaces 33 and 34, respectively, of anode 31 and cathode 30, within the confines of envelope 26. Aqueous electrolyte 27 is disposed in the central portion 35 of separator 32 and in contact with each of facing surfaces 33 and 34.

In the preferred embodiment, the battery will ordinarily comprise a LeClanche electrochemical system including a zinc negative or anode system 31 and a manganese dioxide positive or cathode system 30. The aqueous electrolyte 27 will generally comprise an aqueous ammonium chloride, zinc chloride electrolyte and, in addition, a small amount of mercuric chloride which will be disposed between and in contact with the facing surface of each of the anode and the cathode and in contact and impregnated into electrolyte permeable central portion 35 of separator 27.

As shown in the figures, the preferred anode 31 may itself advantageously comprise, in combination, a composite structure including metallic sheet current collector plate 36 preferably an aluminum, lead or steel, e.g., tin plated steel, sheet material on the order of less than ten mils in thickness possessing a plurality of gas ports or orifices 45 adapted to allow exit from the battery of gas generated or liberated within the energy cells; polymeric current collector 37 preferably a sheet of electrically conductive carbon impregnated water-vapor impermeable vinyl film sold under the trade designation "Condulon" possessing the same relative external dimensions as the anode and in the order of about seven mils in thickness, and a distribution of active zinc negative material 38 either as a zinc paste carried on the conductive polymeric collector 37 or active sheet zinc secured to collector 37, in each instance amalgamated in the conventional manner as, for example, with mercury by contact with mercuric chloride.

The preferred cathode 30 may itself comprise a metallic sheet current collector plate 39 analogous in construction to collector 36; polymeric current collector 40 also analogous in construction to collector 37, and active positive material 41 as a cathodic paste deposition on collector 40, for example, the manganese dioxide/electrically conductive carbon mixture dispersed in a polymeric binder which is employed in the manner conventional in the battery art.

Electrolyte 27 will ordinarily comprise a conventional aqueous ammonium chloride/zinc chloride about 4:1 dispersed in a polymeric binder such as hydroxyethyl cellulose, polyacrylamide, etc., for example, on the order of about five or more percent applied to and impregnated in central portion 35 of separator 32 and in contact with the facing surfaces of active positive material 30 and active negative material 31. In addition, as previously mentioned, a small quantity of mercuric chloride will be present in the electrolyte as a corrosion inhibitor for the zinc anode system.

In general, marginal portions 42 of separator 32 will be maintained free of electrolyte 27 and may be coated on each surface with and impregnated by an electrically nonconducting, water-vapor impervious thermoplastic polyacrylate adhesive adapted to secure the separator to the anode and cathode, respectively, for example, marginal sections 42 of separator 32 to the facing marginal sections of polymeric collectors 37 and 40.

Planar LeClanche type batteries presently in commercial production and distribution generally measure about 2¾×3⅜ inches in terms of their major dimensions and the marginal areas of such batteries will generally comprise about ¼ of an inch. Accordingly, the polyacrylic adhesive may be located on each marginal facing surface at a coverage of about 3 mils and thermally sealed by the pressure application of a heated die possessing the contact surface configuration of the marginal areas to be secured.

As examples of polyacrylate including methacrylate, etc., adhesives comprising a significant proportion of acrylate, preferably greater than about fifty percent by weight acrylate, particularly adapted for employment in the practice of the present invention, mention may be made of, for example: butyl acrylate/diacetone acrylamide/styrene/methacrylic acid (60/30/4/6); butyl acrylate/styrene/methacrylic acid (60/34/6); butyl methacrylate/butyl acrylate (80/20); vinylidene chloride/methyl methacrylate (80/20); and the like, and which optionally may include crosslinking adjuvants such as phenol blocked diisocyanates, etc.

In general, the polyacrylic adhesive may be applied to the marginal sections by any conventional coating technique adapted to effect selective deposition of a thermoplastic adhesive composition on a sheet material and may be coated from an organic solvent system employing a dischargeable organic coating solvent specifically selected for dissolving the specific polyacrylic adhesive elected or, in preferred embodiments, from an aqueous coating system as a latex composition preferably possessing a relatively high solids content, e.g., about thirty to fifty percent, by weight, coalescing to provide a continuous adhesive film upon discharge of the water solvent.

Separator 32 may be readily constructed of and comprise a conventional battery separator material such as aqueous electrolyte permeable fibrous sheet materials, for example, microporous paper, kraft papers and polymeric sheet materials such as woven polyester sheet, etc.

As illustrated by the figures, the battery itself may comprise a multicell structure preferably arranged and constructed with the cells of the battery in superposed or stacked configuration and in electrical series relationship; the number of such cells determined by the power output of each cell and the power requirements of the device to be energized by the battery.

Intermediate each cell 43 there is located intercell connector 44 which in a preferred embodiment will comprise polymeric sheet material of the type described above with reference to current collectors 37 and 40 and upon opposed surfaces there may be secured the respective anode and cathode compositions of the opposed cells.

The capacity of each of the primary battery cells as described will vary substantially in proportion to the areas of their active surfaces. Typically, one such cell will produce about 0.10 to 0.15 amperes per square inch of surface area while yielding about 1.5 volts. For popular photographic camera sizes, an area within each film cassette available for retaining the batteries will provide about 10 to 12 square inches of practical surface. It follows, therefore, that the battery capacity desired for a film supply-power source combination readily may be varied through the simple expedient of combining a select number of discrete cells of predetermined dimension.

The number, positioning and size of the respective gas port or ports 45 employed under a predetermined set of circumstances will be that necessary to insure transit of generated gas from internal the battery and, with respect to the planar LeClanche type batteries commercially employed as detailed above and which generally measure in terms of their major dimensions about 2¾×3⅜ inches, a repetitive series of ports or holes 1/16 in diameter ½ inch on centers extending along the midline of the battery's long dimension have been found to be satisfactory with respect to such commercially distributed batteries.

As previously mentioned, where desired, the preferred composite anode denoted above may itself comprise, in essence, a sheet zinc anode, for example about 2 to 12 mils in thickness and surface amalgamated in the conventional manner. In such circumstances the sheet zinc stock may possess the gas port configuration discussed above and the gas permeable, water-vapor impermeable plastic sheet such as, for example, a polyvinyl chloride, polyethylene, and the like, may be disposed contiguous the external surface of the zinc electrode material and where required maintained in position by any suitable adhesive compatible with the battery structure.

While it is preferred to employ the aforementioned LeClanche electrochemical system (comprising manganese dioxide positive active material, zinc negative active material, and an electrolyte comprising ammonium chloride and zinc chloride), the battery may employ a wide variety of positive and negative electrode materials and a wide variety of electrochemical systems including both primary and secondary systems.

Film unit 11 may be advantageously constructed in accordance with the disclosure of any of U.S. Pat. Nos. 3,594,165; 3,689,262; 3,672,890; or the like.

Specifically preferred film units of the types disclosed in the last-mentioned U.S. patents comprise integral negative positive color diffusion transfer process film units which include, in combination, a photosensitive silver halide layer having associated therewith a diffusion transfer process dye image-forming material adapted to diffuse to a diffusion transfer process image-receiving layer as a function of the point-to-point degree of exposure and processing of the photosensitive silver halide layer; a diffusion transfer process image-receiving layer adapted to receive dye image-forming material diffusing thereto to provide dye transfer image formation, and an opaque layer disposed intermediate the photosensitive silver halide layer and the image-receiving layer against which the dye transfer image in the reception layer may be viewed subsequent to formation.

As disclosed in U.S. Pat. No. 3,672,890 a composite photosensitive structure, particularly adapted for reflection type photographic diffusion transfer color process employment, which comprises a plurality of essential layers including, in sequence, a dimensionally stable layer preferably opaque to incident radiation; one or more silver halide emulsion layers having associated therewith a diffusion transfer process dye image-providing material; a polymeric layer adapted to receive solubilized dye image-providing material diffusing thereto; and a dimensionally stable transparent layer, may be exposed to incident actinic radiation and processed by interposing, intermediate the silver halide emulsion layer and the reception layer, a processing composition and an opacifying agent, which may reflect incident radiation, in a quantity sufficient to mask dye image-providing material associated with the silver halide emulsion.

In a preferred embodiment, the composite photosensitive structure includes a rupturable container, retaining an alkaline processing composition and the opacifying agent, fixedly positioned extending transverse a leading edge of the composite structure in order to effect, upon application of compressive pressure to the container, discharge of the processing composition intermediate the opposed surfaces of the reception layer and the next adjacent silver halide emulsion.

The liquid processing composition, distributed intermediate the reception layer and the silver halide emulsion, permeates the silver halide emulsion layers of the composite photosensitive structure to initiate development of the latent images contained therein resultant from photoexposure. As a consequence of the development of the latent images, dye image-providing material associated with each of the respective silver halide emulsion layers is individually mobilized as a function of the point-to-point degree of the respective silver halide emulsion layer's photoexposure, resulting in imagewise distributions of mobile dye image-providing materials adapted to transfer, by diffusion, to the reception layer to provide the desired transfer dye image. Subsequent to substantial dye image formation in the reception layer, means associated with composite structure are adapted to convert the pH of the film unit from a first processing pH at which dye image-providing material is diffusible as a function of the film unit's photoexposure to a second pH at which the transfer dye image exhibits increased stability, preferably a sufficient portion of the ions of an alkaline processing composition transfers, by diffusion, to a polymeric neutralizing layer to effect reduction in the alkalinity of the composite film unit from a first alkaline processing pH to the second pH at which dye image-providing material is substantially nondiffusible, and further dye image-providing material transfer is thereby substantially obviated.

The transfer dye image is viewed, as a reflection image, through the dimensionally stable transparent layer against the background provided by the opacifying agent, distributed as a component of the processing composition, intermediate the reception layer and next adjacent silver halide emulsion layer. The thus-formed opacifying stratum effectively masks residual dye image-providing material retained in association with the silver halide emulsion layer subsequent to processing.

In U.S. Pat. No. 3,415,644, the dimensionally stable layer of the film unit next adjacent the photosensitive layer or layers is disclosed to be opaque, the opacifying agent is initially disposed in an aqueous alkaline processing composition and the film unit's pH modulating means are disclosed to comprise a polymeric layer disposed intermediate the dimensionally stable transparent layer and the reception layer and adapted to reduce, subsequent to substantial dye transfer image formation, the pH of an aqueous alkaline processing composition from a first processing pH at which the dye image-forming material or materials are soluble and diffusible in the composition as a function of the photoexposure of the photosensitive silver halide layer associated therewith to a second pH at which the dye image-forming material or materials are substantially nondiffusible and, as disclosed in U.S. Pat. No. 3,415,646, the dimensionally stable layer of the film unit next adjacent the photosensitive silver halide layer or layers may be transparent to incident actinic radiation and, as further disclosed in U.S. Pat. No. 3,415,645, in such instance the opacifying agent may be initially disposed in the film unit intermediate the reception layer and next adjacent silver halide layer.

As disclosed in U.S. Pat. Nos. 3,615,421 and 3,661,585, the opacifying component of the film unit may optionally be initially disposed as a preformed processing composition permeable layer, intermediate the reception layer and next adjacent silver halide layer, in a concentration which prior to photoexposure is insufficient to prevent transmission therethrough of exposing actinic radiation and which, subsequent to processing, possesses an opacifying capacity effective to mask residual dye image-providing material retained associated with the film unit's silver halide emulsion layers, and in U.S. Pat. No. 3,647,435, the opacifying component of the film unit may optionally be initially formed in situ, intermediate the reception layer and next adjacent silver halide layer, during photographic processing of the film unit.

In U.S. Pat. No. 3,647,437, the opacifying component is disclosed to optionally comprise a light-absorbing reagent such as a dye which is present as an absorbing species at the first pH and which may be converted to a substantially non-absorbing species at the second pH, and in U.S. Pat. Nos. 3,473,925; 3,573,042 and 3,576,626, opacifying and reflecting component, respectively, may be individually interposed intermediate the silver halide layer and reception layer by selective distribution from a composite or a plurality of rupturable containers.

In U.S. Pat. No. 3,573,043, the polymeric neutralizing layer is disclosed to be optionally disposed intermediate the dimensionally stable opaque layer and next adjacent essential layer, i.e., next adjacent silver halide/dye image-providing material component, to effect the designated modulation of film unit's environmental pH; U.S. Pat. No. 3,576,625 discloses the employment of particulate acid distributed within the film unit to effect the modulation of the environmental pH, and U.S. Pat. No. 3,573,044 discloses the employment of processing composition solvent vapor transmissive dimensionally stable layers to effect process modulation of dye transfer as a function of solvent concentration.

Where desired, the film unit may also be constructed in accordance with the disclosure of U.S. Pat. Nos. 3,594,164; 3,594,165; 3,689,262 and 3,701,656 to comprise a composite photosensitive structure including a transparent dimensionally stable layer carrying a reception layer, a processing composition permeable opaque layer and a photosensitive silver halide layer and the film unit may include a separate dimensionally stable sheet element adapted to be superposed on the surface of the photosensitive structure opposite the dimensionally stable layer and may further include means such as a rupturable container retaining processing composition for distribution of a processing composition intermediate the sheet and photosensitive structure to effect processing. As further disclosed in certain of the last-cited patents and applications, in structures wherein the receptor is positioned next adjacent the transparent layer or the processing composition and/or the sheet is to be separated from the remainder of the film unit subsequent to processing, the latter elements may optionally include opacifying component.

As disclosed in U.S. Pat. No. 3,620,724, the dimensionally stable layer referred to may be opaque and in which instance the photosensitive silver halide layer is positioned next adjacent the opaque support layer and the opacifying component of the film unit's processing composition permeable opaque layer will be disposed in the unit in a concentration insufficient to prevent transmission therethrough of exposing actinic radiation and which, subsequent to processing, possesses an opacifying capacity effective to mask residual dye image-providing material retained associated with the silver halide layer, and as disclosed in U.S. Pat. No. 3,647,434, the opacifying agent may be optionally formed in such film unit, in situ, during processing of the unit.

As illustrated in FIGS. 1 and 2, a gas collector may be employed which may comprise a planar sheet structure or member 12 adapted to capture ammonia gas, water or mercury vapor or other volatile effluvia liberated or released from battery 13 by the evaporation and/or decomposition of electrolyte 27 to prevent photographically deleterious action of the effluvia on the photographic sensitometry of film units 11 disposed in cassette 10.

Collector 12 may itself readily comprise a metal salt adapted to form an ammoniate, i.e., an ammonia addition compound structurally analogous to a hydrate, upon contact with ammonia, preferably a transition metal salt adapted to form an ammoniate upon such contact and most preferably a transition metal salt the cation of which is $Fe^{++}$, $Ni^{++}$, $Mn^{++}$ or $Cu^{++}$. Although an anion of such salt may comprise any anion which does not interfer with the efficient and effective formation of the ammoniate, in general, simple anions readily available commercially as a component of the preferred salts may comprise $Cl^-$, $Br^-$, $I^-$ or $SO_4^=$.

Collector 12 may be constructed by disposition of the metal salt within a gas permeable and preferably adsorbent fibrous matrix such as blotting or filter paper, as, for example, by contacting or dipping such matrix with a solution of the metal salt which may be aqueous to impregnate the carrier matrix and removing the solvent. Where desired, the collector may also be constructed by coating an ammonia gas permeable and preferably adsorbent layer containing the salt on a dimensionally stable support, preferably a gas permeable and adsorbent support. Such coating may be accomplished employing any of the conventional coating or casting techniques available in the art and the coating composition may readily comprise a dispersion of the selected salt in a gas permeable polymeric matrix such as, for example, gelatin, polyvinyl alcohol, polyacrylamide, hydroxyethyl cellulose, or the like.

In a particularly preferred construction, the metal salt adapted to form an ammoniate upon contact with ammonia will be disposed in intimate admixture with the selected gas adsorbent matrix and most preferably in admixture, and particularly surface contact, with a dispersion of a gas adsorbent possessing maximum active surface area. Specifically preferred adsorbents will comprise a particulate dispersion of, for example, gas adsorbent carbon black, alumina, silica gel, and the like and particularly those gas adsorbents which possess a high water vapor adsorption or adsorption capacity and efficiency per unit weight and extensive active surface area.

In general, the concentration of salt and/or adsorber employed will be that necessary to insure collection and capture of the maximum amount of ammonia, water and mercury vapor, and other effluvia theoretically capable of liberation from the battery employed in the specific construction of the film assembly design selected.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A planar battery which comprises, in combination and in superposed relationship, electrical energy generating components including:
   (a) a planar anode;
   (b) a planar cathode superposed substantially coextensive the anode;
   (c) a planar separator positioned intermediate and extending substantially coextensive the facing surfaces of the anode and the cathode including electrolyte free marginal portions and an aqueous electrolyte permeable central portion;
   (d) an aqueous electrolyte disposed in the central portion of the separator and in contact with the facing surfaces of the anode and the cathode; and
   (e) an electrically nonconducting polyacrylate sealant comprising more than fifty percent by weight acrylate, said sealant being a butyl acrylate/diacetone acrylamide/styrene/methacrylic acid (60/30/4/6), said sealant being located only peripherally of said centrally disposed aqueous electrolyte located on electrolyte free marginal surfaces of the separator, permeating said separator, and securing said separator to contiguous facing surfaces of said anode or said cathode.

2. A planar battery which comprises, in combination and in superposed relationship, electrical energy generating components including:
   (a) a planar anode;
   (b) a planar cathode superposed substantially coextensive the anode;
   (c) a planar separator positioned intermediate and extending substantially coextensive the facing surfaces of the anode and the cathode including electrolyte free marginal portions and an aqueous electrolyte permeable central portion;
   (d) an aqueous electrolyte disposed in the central portion of the separator and in contact with the facing surfaces of the anode and the cathode; and
   (e) an electrically nonconducting polyacrylate sealant located only peripherally of said centrally disposed aqueous electrolyte located on electrolyte free marginal surfaces of the separator, permeating said separator, and securing said separator to contiguous facing surfaces of said anode or said cathode, wherein the marginal portions of the separator comprise electrolyte permeable separator sheet impregnated with an electrically nonconductive, water-vapor impermeable thermoplastic polyacrylate adhesive in a concentration effective to prevent electrolyte permeation of the marginal portions of the separator sheet, and wherein the thermoplastic polymer is a butyl acrylate/diacetone acrylamide/styrene/methacrylic acid (60/30/4/6).

* * * * *